(12) United States Patent
Salvino et al.

(10) Patent No.: US 12,066,252 B1
(45) Date of Patent: Aug. 20, 2024

(54) GAS COLLECTION SYSTEM

(71) Applicants: Chris Salvino, Scottsdale, AZ (US); Kenneth Altshuler, Longmont, CO (US)

(72) Inventors: Chris Salvino, Scottsdale, AZ (US); Kenneth Altshuler, Longmont, CO (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 18/230,125

(22) Filed: Aug. 3, 2023

(51) Int. Cl.
| | |
|---|---|
| *F28B 3/08* | (2006.01) |
| *F28B 9/08* | (2006.01) |
| *B01D 5/00* | (2006.01) |
| *B64G 4/00* | (2006.01) |
| *B64G 99/00* | (2009.01) |
| *E21C 51/00* | (2006.01) |
| *F04B 37/08* | (2006.01) |

(52) U.S. Cl.
CPC ............ *F28B 3/08* (2013.01); *F28B 9/08* (2013.01); *B01D 5/0024* (2013.01); *B64G 4/00* (2013.01); *B64G 99/00* (2022.08); *E21C 51/00* (2013.01); *F04B 37/08* (2013.01)

(58) Field of Classification Search
CPC . F28B 3/08; F28B 9/08; B01D 5/0024; F04B 37/08; B64G 99/00; B64G 4/00; E21C 5/00
USPC .......................................................... 62/617
See application file for complete search history.

(56) References Cited

U.S. PATENT DOCUMENTS

| | | | |
|---|---|---|---|
| 5,426,949 A * | 6/1995 | Saho | F25B 9/00 62/51.1 |
| 9,134,047 B2 | 9/2015 | Black et al. | |
| 10,222,121 B2 | 3/2019 | Cullinane et al. | |
| 10,481,048 B2 | 11/2019 | Giles | |
| 11,566,521 B2 | 1/2023 | Sercel et al. | |
| 11,624,542 B2 | 4/2023 | Sung | |
| 11,852,016 B2 | 12/2023 | Kuhns | |
| 2008/0003133 A1 | 1/2008 | Taylor et al. | |
| 2011/0155966 A1 | 6/2011 | Hsu | |
| 2011/0168164 A1 | 7/2011 | Zillmer et al. | |
| 2016/0024921 A1 | 1/2016 | Ethridge | |
| 2019/0271228 A1 | 9/2019 | Sowers, Jr. et al. | |
| 2021/0116889 A1 | 4/2021 | Keravala et al. | |

(Continued)

OTHER PUBLICATIONS

"Development of Lunar Ice/Hydrogen Recovery System architecture" Rice for Universities Space Research Association, Jan. 1, 2000.*

*Primary Examiner* — Joel M Attey
(74) *Attorney, Agent, or Firm* — Kenneth Altshuler

(57) ABSTRACT

A vapor collection system that can be used at an extraterrestrial body is envisioned to collect target gaseous atoms and molecules that are floating around in a shielded environment at a pressure at or less than $1 \times 10^{-5}$ bar. The shielded environment is defined within sidewalls and in some cases is defined within a cover. A condensation surface in the shielded environment is maintained at a temperature between 2° Kelvin and 100° Kelvin to collect the target gas that is floating around, which condenses on the condensation surface as a liquid. A collection receptacle at the condensation surface collects the liquid. A heating element in the shielded environment is made to heat and release the target gas from minerals at or beyond the rim. The gas floats around in the shielded environment.

19 Claims, 13 Drawing Sheets

(56) References Cited

U.S. PATENT DOCUMENTS

2021/0404338 A1    12/2021  Metzger
2024/0035379 A1*   2/2024   Grillos, II ................ B64G 4/00

* cited by examiner

GAS COLLECTION SYSTEM

CROSS-REFERENCE TO RELATED APPLICATIONS

None

BACKGROUND OF THE INVENTION

1. Field of the Invention

The present invention relates generally to collecting gaseous material in a very low-pressure environment (below $1\times10^{-5}$ bar).

2. Description of Related Art

Helium-3 (He-3) holds immense potential as a clean and efficient energy source, offering numerous benefits for various applications. It has been discovered that He-3 is a highly efficient fuel for nuclear fusion, which has the potential to provide a nearly limitless and environmentally friendly energy solution. When He-3 fuses with deuterium, it produces a helium atom, a proton, and a tremendous amount of energy. Unlike traditional nuclear fission, fusion reactions release energy without generating hazardous radioactive waste or greenhouse gas emissions. Harnessing He-3 for fusion could revolutionize the energy landscape, providing a stable and sustainable source of power for the future.

However, despite its remarkable benefits, mining He-3 on Earth faces significant limitations. For one thing, He-3 is incredibly scarce on our planet. It is primarily found in minute quantities in the top surfaces of lunar soil, known as regolith, and is sparsely present in the Earth's atmosphere. Consequently, the extraction of He-3, whether on Earth or the Moon, is challenging and expensive. Moreover, mining it on the Moon poses logistical difficulties requiring advanced technologies and significant investments. Even assuming mining on the Moon is successful, transporting the mined He-3 from the Moon to Earth presents significant technical challenges and high costs. These limitations highlight the need for further research and development to find more accessible and cost-effective sources of He-3 or to explore alternative fusion fuel options that do not rely solely on He-3.

The subject matter disclosed herein is generally directed to innovations related to collecting He-3 and other useable gaseous elements on extra-terrestrial bodies.

SUMMARY OF THE INVENTION

The present invention generally relates to an apparatus for mining and collecting He-3 as well as other target gaseous elements from extra-terrestrial bodies in a very low-pressure environment. A very low pressure is defined as below $1\times10^{-5}$ bar.

Certain embodiments of the present invention contemplate a vapor collection system that has a shielded environment in a pressure at or less than $1\times10^{-5}$ bar. The shielded environment comprises sidewalls extending from a rim to a top edge, wherein the shielded environment is defined inside of the sidewalls. In some cases, the shielded environment is a cover. A condensation surface is disposed in the internal volume, wherein the condensation surface maintained at a temperature between 2° Kelvin and 100° Kelvin. A collection receptacle that comprises an orifice interface is at the condensation surface and cooperates with the condensation surface to collect liquid condensate from the condensation surface. A heating element is in the shielded environment, wherein the heating element is configured to direct heat to a heat region at or beyond the rim. The heating element can be a laser, a lattice of heated spikes, or a radiative heating element, just to name a few examples, though other heating elements, such as a rake or sifter that can waterfall regolith across a heater, are envisioned without departing from the scope and spirit of the present invention.

Still other embodiments of the present invention contemplate a gas collecting arrangement comprising a shielded environment that when in operation is at a pressure of less than $1\times10^{-5}$ bar. The gas collecting arrangement has a condensation surface in the internal volume, wherein there is a means for maintaining the condensation surface at a temperature between 2° Kelvin and 100° Kelvin. Such a means can further include electric and or laser cooling or some combination thereof. The gas collecting arrangement also comprises a collection receptacle that interfaces the condensation surface to collect the liquid condensate from target gas that accumulates on the condensation surface while it is in the temperature range between 2° Kelvin and 100° Kelvin. A heating element is envisioned to be in the shielded environment, wherein the heating element heats a target region of minerals at or beyond the rim to free the target gas from minerals.

In another embodiment of the present invention, a vapor collector can comprise a shielded environment defined by a cover, wherein the shielded environment is configured to operate at a pressure of less than $1\times10^{-5}$ bar. The vapor collector further comprises a condensation surface, which is disposed in the shielded environment. The condensation surface is maintained in operation at a temperature between 2° Kelvin and 100° Kelvin, which can be, for example, at a dark portion on the lunar surface. There can further be a collection receptacle comprising an orifice that interfaces the condensation surface. The vapor collector is envisioned to further comprise a heating element that is in the shielded environment. The heating element is configured to direct heat to a heat region at or beyond the rim.

DETAILED DESCRIPTION

Figure 1A:
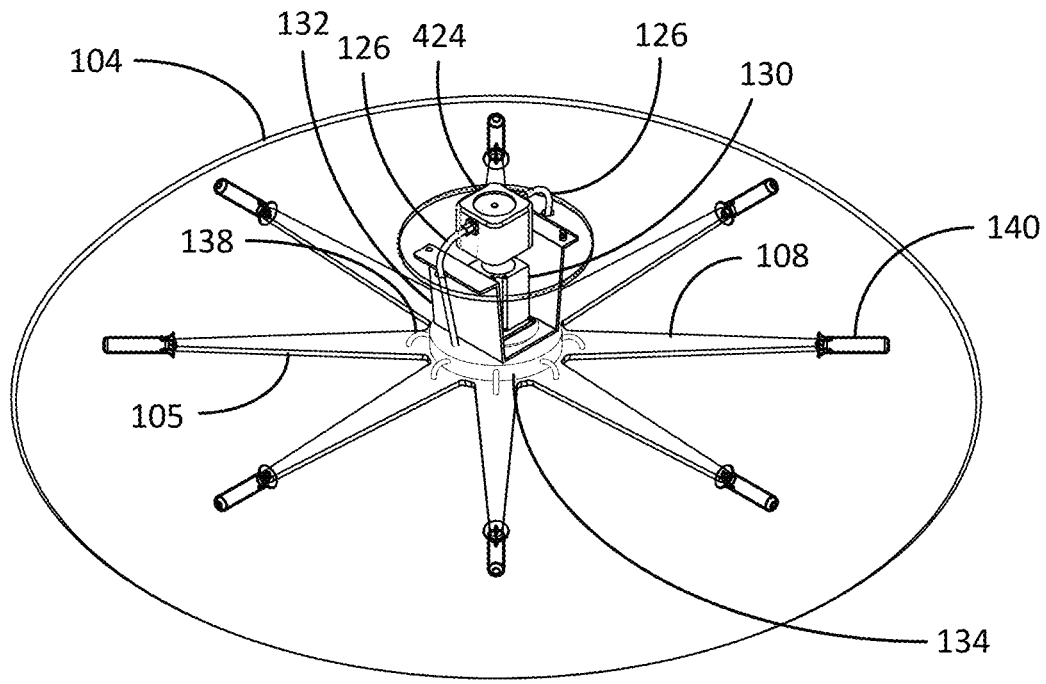
FIGS. 1A-1C are line drawings of a vapor collection system embodiment constructed in accordance with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/-value assigned to "essentially", then assume essentially means to be within +/-2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to collecting vaporize gaseous atoms and molecules in an extremely low-pressure environment. Extremely low-pressure environment is defined herein as below $1 \times 10^{-5}$ bars, wherein pressure at sea-level on Earth is approximately 1 bar. Aspects of the present invention consider mining gaseous atoms and molecules on extraterrestrial bodies such as the Moon, asteroids, moons orbiting other planets, etc., for example. Many of these extraterrestrial bodies have little to no ambient pressure at or just beyond their surfaces and depending on the size of the extraterrestrial body have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon. The Moon's atmosphere (the surface boundary exosphere) has a pressure of about $3 \times 10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, helium-3, a light stable isotope of helium having two protons and one neutron, which has promise as an important constituent in fusion reactions, is far more abundant on the Moon than the Earth. In some estimates, helium-3 is more than a thousand times more abundant on the Moon than compared to the Earth making the Moon a better target to obtain helium-3.

Certain embodiments of the present invention envision extracting target gaseous materials from the Moon by heating up moon regolith (lunar soil/minerals) to gas vaporizing temperatures defined as temperatures that are high enough to liberate/vaporize these target gaseous materials from moon regolith, or simply "regolith". The vaporized target gaseous materials are then collected as liquid from condensation surfaces that are at or below the condensation temperatures corresponding to each of the target gaseous materials. When condensed i.e., liquefied, the liquid is collected and retained in containers, which improves the transportation of these target materials.

In that light, embodiments of the present invention contemplate a vapor collection system that can be used at an extra-terrestrial body to collect target gaseous atoms and molecules that are floating around in a shielded environment at a pressure at or less than $1 \times 10^{-5}$ bar. The shielded environment is defined within sidewalls and in some cases is defined within a cover. A condensation surface in the shielded environment is maintained at a temperature between 2° Kelvin and 100° Kelvin to collect the target gas that is floating around, which condenses on the condensation surface as a liquid. A collection receptacle at the condensation surface collects the liquid. A heating element in the shielded environment is made to heat and release the target gas from minerals at or beyond the rim. The gas floats around in the shielded environment.

Figure 1B:
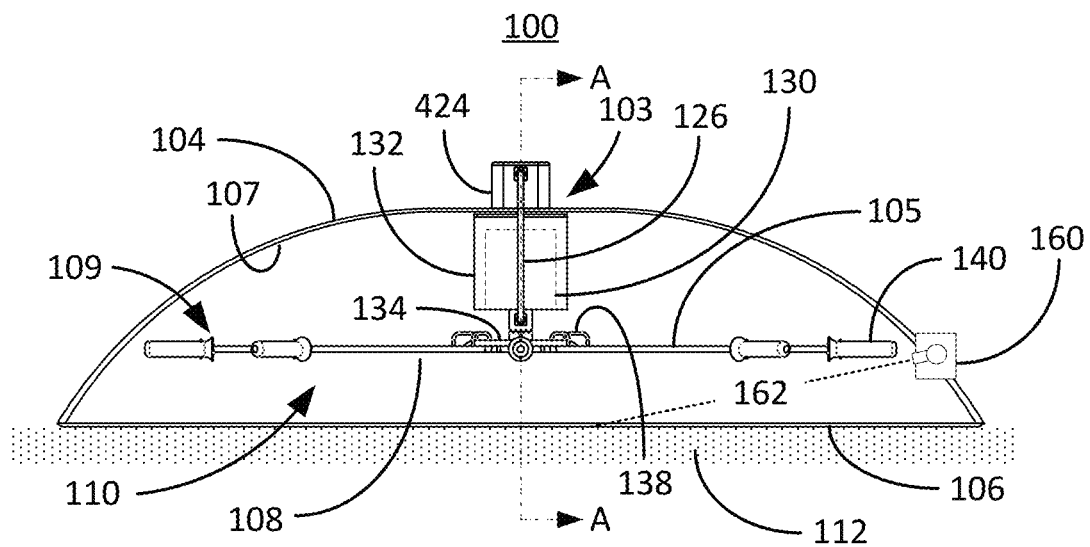
Figure 1C:
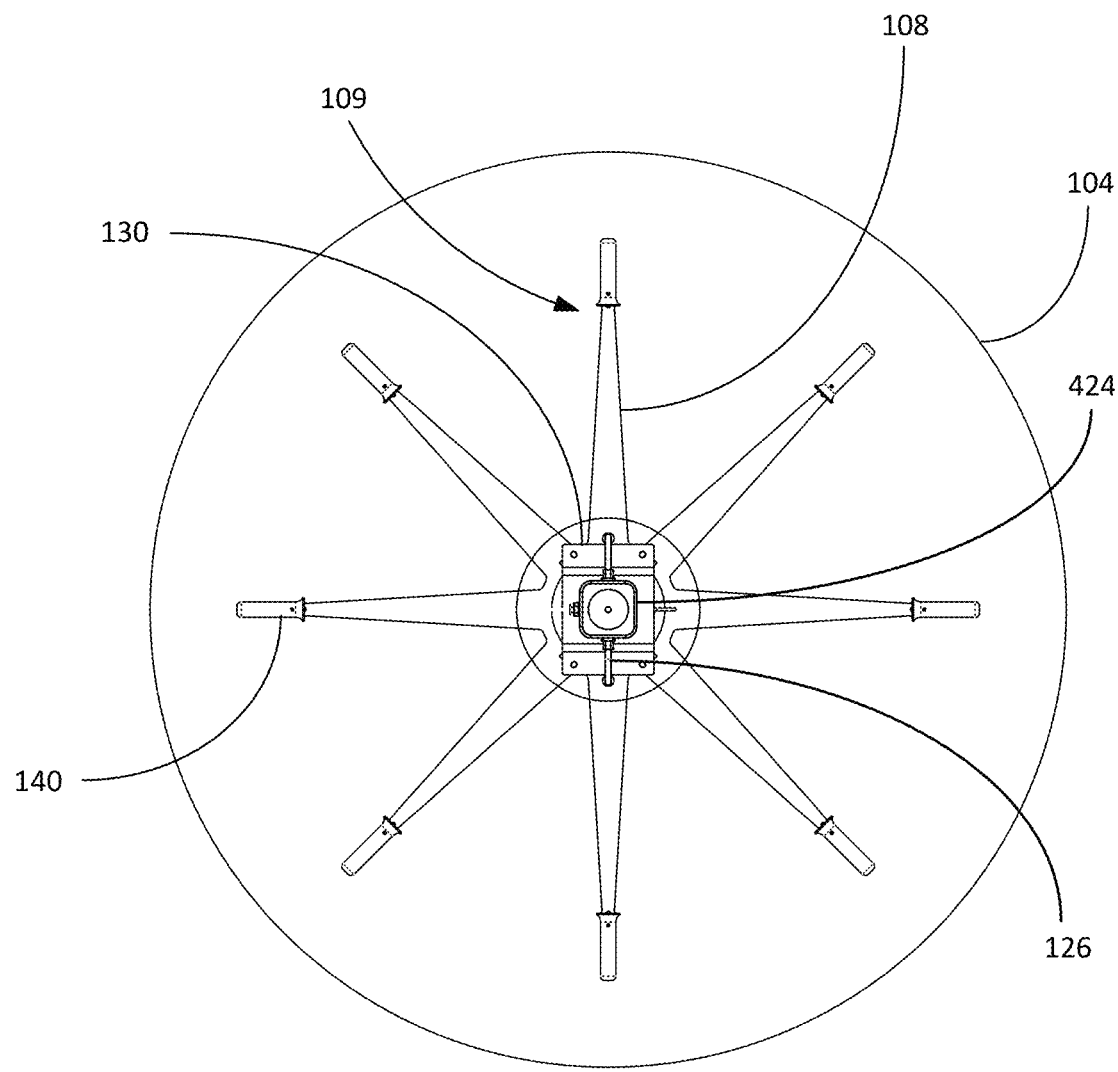

Referring to the drawings, FIGS. 1A-1C are line drawings of a vapor collection system embodiment constructed in accordance with embodiments of the present invention. FIG. 1A is a simplified isometric view of a vapor collection system embodiment 100, wherein the dome cover 104 is depicted as transparent to view the elements therein. In this embodiment, a cryogenic pump 424 extends from the dome apex 103 (shown in FIG. 1B), which is in communication with a cryogenic tank 134 via cryogenic transfer lines 126. The pump 424 pumps cryogenic fluid from the cryogenic tank 134 to chill the plurality of blades 108, which receive the cryogenic fluid via cryogenic feed lines 138. The blades 108 are the condensation surfaces 105 configured to collect vaporized target material 115 of FIG. 3A (atoms and molecules) in the form of liquid condensation. The plurality of blades 108 are configured to spin via a motor 130 inside of a domed cover 104. Certain embodiments envision the blades 108 spinning between 5–60 rpm, though other speeds may be considered outside of this range depending on the desired accumulation of gaseous material 115. The motor 130 is mounted inside of a motor shield 132, which provides support for the motor 130 from the domed cover 104. The spinning blades 108 serve several purposes including A) providing a higher probability of colliding with the vaporized target atom or molecule 115 that when they hit the chilled blades 108, the gaseous material 115 will condense and liquify on the chilled condensation surface 105 and B) migrating the liquified target material by way of centripetal force to the distal ends 109 of each of the blades 108. In this embodiment, the liquefied target material migrates (via the centripetal force from the spinning blades 108) into collection tubes 140 that are located at each of the blade distal ends 109. Certain embodiments envision the blades 108 being made of copper or silver and in some cases coated with gold for their superior heat transfer capacity. The chilled condensation blades 108 are chilled to temperatures at the condensation point of the gaseous target material 115 which causes the gaseous target material 115 to collect or otherwise stick and coalesce on the blades 108.

As shown in FIG. 1B, the blades 108 are located inside the internal volume 110 of a domed cover 104. The domed cover 104 extends from a dome apex 103 to a dome rim 106. The dome rim 106 is configured to rest atop regolith 112. The internal volume 110 of the cover 104 is defined as the volume of space bounded between the internal cover surface 107 and the regolith 112 (shown here as the speckled dust). A heating source 160 inside of the cover 104 is configured to heat the regolith 112 at a temperature that vaporizes the target materials from the regolith 112 thereby expelling the vaporized target materials into the internal volume 110. In this embodiment, the heating source 160 is a laser on a gimble that sweeps a laser beam 162 over the surface of the regolith 112 to direct the laser beam 162 to heat a target region 116 on the surface of the regolith 112. In other words, the laser beam 162 provides localized or point heat that heats a small area 112 of the surface of the regolith 112 where the laser beam 162 hits the regolith 112 as the laser beam 162 sweeps over the surface of the regolith 112. Optional heating source embodiments include radiative elements that heat the surface of the regolith 112, heated teeth that penetrate the regolith 112, such as a heated rake or heated spikes, just to name several examples. The regolith 112 is envisioned to be heated at a temperature above 500° Kelvin, with some temperature ranges between 500°-1500° Kelvin. For example, He-3 is liberated from regolith from between about 875°-1100° Kelvin. In some instances, gas can be liberated from the heated regolith 112 in conjunction with a combination of chemicals.

FIG. 1C is a top-down view of the vapor collection system 100 looking through the domed cover 104. As shown, the eight condensation blades 108 are driven by the motor 130 that spins about the central axis 112, which when spinning causes condensed material (condensate) to migrate to the distal ends 109 of the blades 108, and subsequently to the collection tubes 140, by way of centripetal force. The pump 424 circulates the cryogenic fluid through the blades 108 while they spin by way of hydraulic slip rings (not shown), which makes feeding cryogenic fluid to the blades 108 while continuously rotating a possibility, as known to those skilled in the art.

Figure 1D:
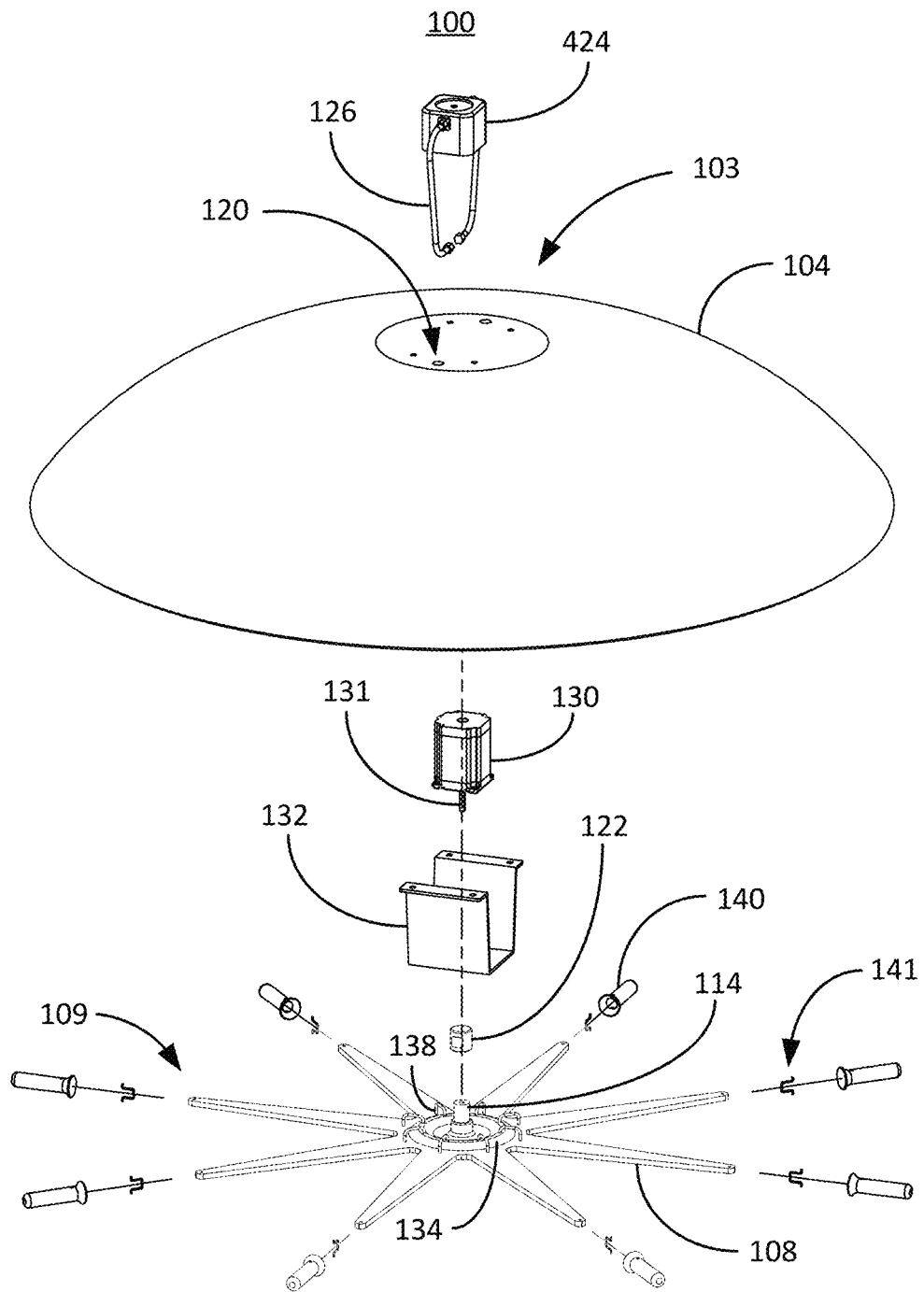
FIG. 1D is a line drawing of an exploded view of the vapor collection system of FIG. 1A.

FIG. 1D is a line drawing of an exploded view of the vapor collection system 100 of FIG. 1A. As shown, the cryogenic pump 424 comprises cryogenic transfer lines 126 that extend through accommodating holes/ports 120 at the apex 103 of the cover 104. Below the dome cover 104 is the blade spinning motor 130 that spins the condensation blades 108. The blade spinning motor 130 is supported by a motor shield 132 that is mounted to the inner surface of the dome apex 103. The motor shaft 131 extends into a blade central axis shaft 114 in the center of the eight blades 108, as shown, which when turned on spins the eight blades 108. A controller can be connected to the blade spinning motor 130 to control the motor's speed. A slip ring arrangement 122 (also known as a rotary joint) is attached to the cryogenic transfer lines 126 to transmit cryogenic fluid through the cryogenic reservoir 134 to the blades 108 via the cryogenic feedlines 138 while the blades 108 are spinning. The slip ring arrangement 122 is a self-contained assembly that prevents leakage or damage to the stationary and rotary parts so that cryogenic fluid can circulate continuously through the rotating blades 108. Each of the collection tubes 140 is attached to a corresponding blade distal end 109 via a mechanical clip 141.

Figure 1E:
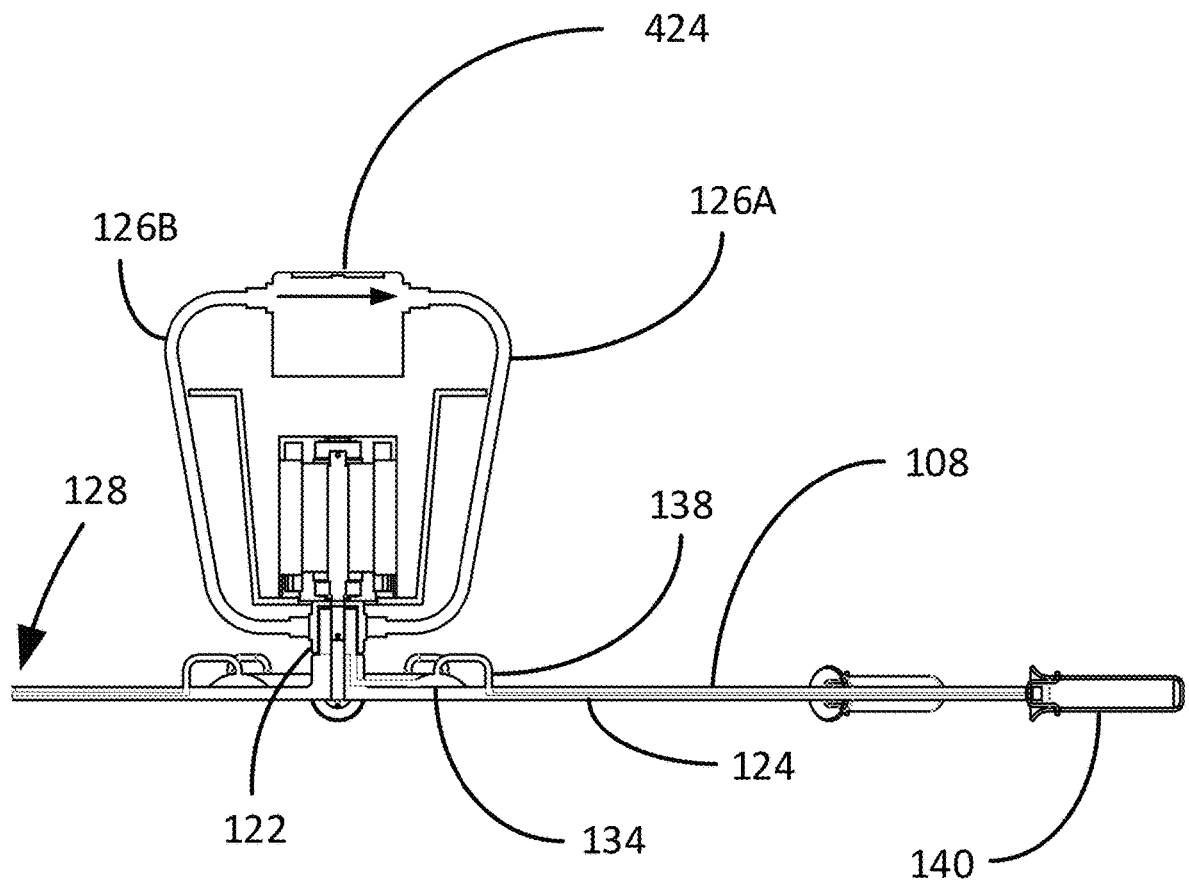
FIG. 1E is a line drawing of a cross-section view along cut-line A-A from FIG. 1B with the left-hand side of the blades cut away to improve resolution of the system consistent with embodiments of the present invention.

FIG. 1E is a line drawing of a cross-section view along cut-line A-A from FIG. 1B with the left-hand side of the blades 108 cut away to improve resolution of the components of interests in this figure. As shown, the cryogen pump 424 is configured to pump cryogenic fluid (see arrow below the top of the cryogen pump 424) down a cryogenic transfer feed line 126A to the cryogen tank 134 via the slip ring arrangement 122. The circulating cryogenic fluid is moved through the cryogen feedlines 138 and into the blades 108 by way of the blade cryogen heat exchange tubes 124, which in some embodiments are described more detail in conjunction with FIGS. 7A and 7B. The cryogenic fluid is configured to chill the blades 108 down to a temperature that is below the condensation point of the gaseous target material 115 that is floating around the internal volume 110 inside of the cover 104. Cryogenic fluid is then returned to the pump 424 by way of cryogenic transfer return line 126B where the cryogenic fluid is circulated. Not shown here but depicted in FIG. 7A and described in the associated text is a heat exchange embodiment that includes a compressor and heat exchanger 430, which pulls the heat away from the cryogenic fluid upon returning to the pump 424.

Figure 2A:
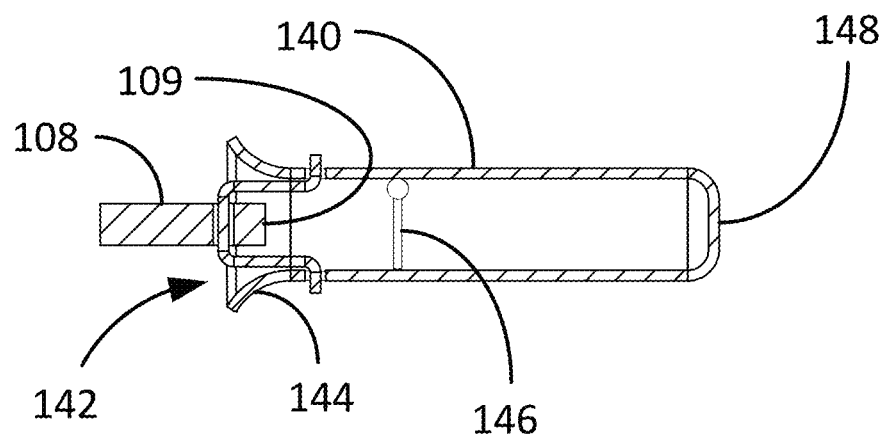
FIGS. 2A and 2B are line drawings of a collection tube embodiment consistent with embodiments of the present invention.
Figure 2B:
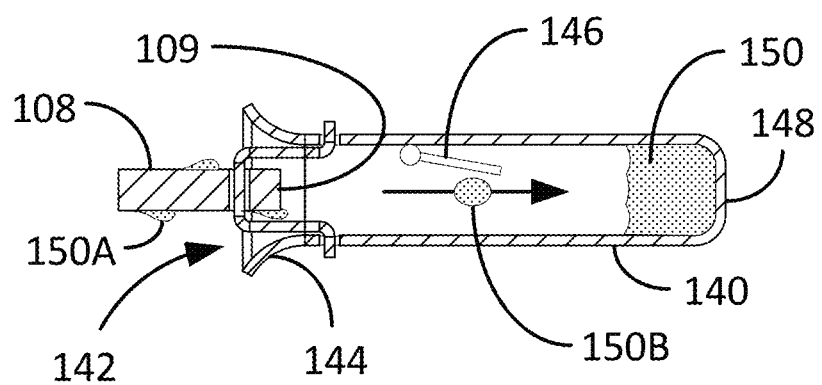

FIG. 2A is a line drawing of a collection tube embodiment consistent with embodiments of the present invention. As shown, the collection tube embodiment 140 is essentially a closed tube with an inlet port (open end) 142 interfacing the blade distal end 109. The collection tube 140 comprises a tube flare 144 that has an outwardly flared lip to provide a larger inlet port 142 for enhanced fluid collection 150 from the blade 108. In operation, as shown in FIG. 2B, as the condensation blade 108 spins, the condensation liquid 150 that is on a condensation blade 108 migrates to the blade distal end 109 where the condensed droplets 150B are thrown off to collect in a pool of condensed target material 150 at the tube distal end 148. The spring valve 146 opens due to the centripetal force of the combination spinning blade 108 and tube 140 permitting the droplets 150B to pass to the tube distal end 148, see the arrow in conjunction with the droplet 150B. When the blades 108 are not spinning the spring valve 146 closes thereby trapping the liquid 150 inside of the tubes 140.

Figure 3A:
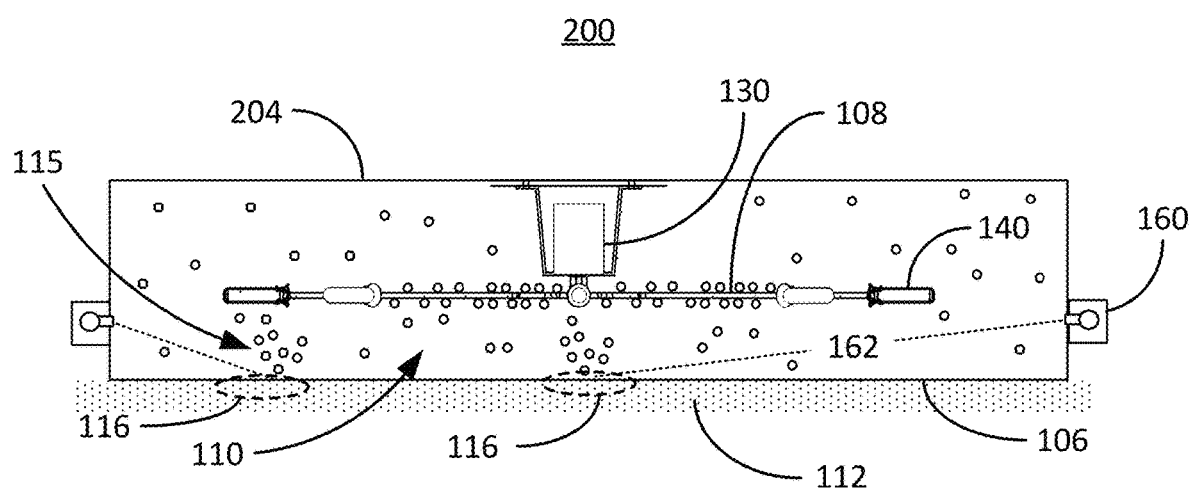
FIGS. 3A and 3B are line drawings of another embodiment of a vapor collection system in operation consistent with embodiments of the present invention.
Figure 3B:
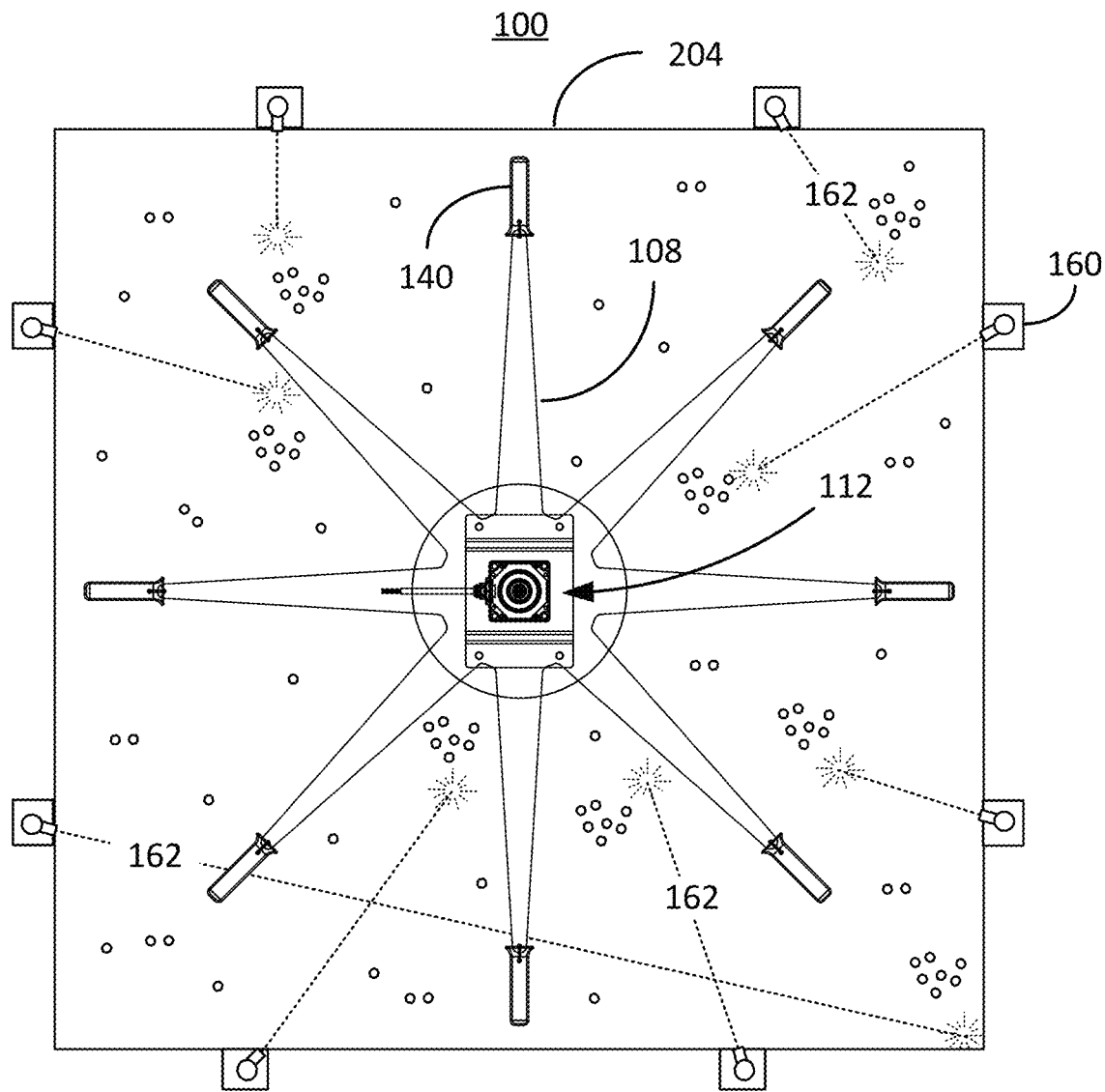

FIGS. 3A and 3B are line drawings of another embodiment of a vapor collection system in operation consistent with embodiments of the present invention. FIG. 3A is a side view of the vapor collection system embodiment 200 and FIG. 3B is a top-down view of the vapor collection system embodiment 200. As shown in these figures, instead of a dome shaped cover, this vapor collection system 200 comprises a square shaped cover 204. The square shaped cover 204 provides a more efficient extraction of the vaporized target materials 115 from the regolith 112 because mining the Moon's surface can be accomplished via a patchwork of squares by simply moving the cover 204 from a mined square patch to an unmined square patch, thus mining a row of regolith 112. As shown in FIG. 3A, the laser system 160 directs the laser beam 162 across the regolith surface 112 ablading the regolith 112, which in some embodiments is between 2 mm and 2 cm deep, for example, thereby liberating the gaseous target material 115 from the regolith 112. The liberated gaseous target material 115 naturally disperses in the internal volume 110 defined by the cover 204. As the chilled blades 108 rotate, gaseous target material 115 condenses onto the blades 108 and migrates as droplets 150B to the collection tubes 140. In this embodiment, there are multiple lasers 160 simultaneously ablading the regolith 112.

Figure 4:
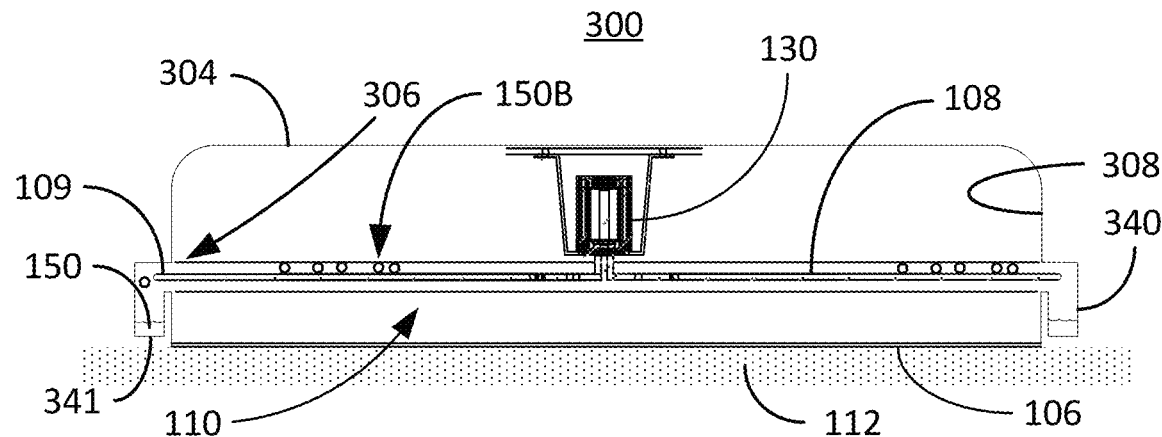
FIG. 4 is a line drawing that illustratively depicts an optional condensed target material collector consistent with embodiments of the present invention.

FIG. 4 is a line drawing that illustratively depicts an optional condensed target material collector consistent with embodiments of the present invention. As shown, the vapor collection system embodiment 300 is very similar to the systems 100 and 200 but instead of using collection tubes 140, the vapor collection system embodiment 300 relies on a circular slot 306 in the cover sidewall 308 that leads to a reservoir 310 that holds the condensed target material 150 that drips into it. Hence, as the condensation blades 108 spin inside of the internal volume 110 of the cover 304, the condensation droplets 150B that form on the cold/chilled condensation blades 108 migrate to the blade distal ends 109 that are spinning inside of the circular slot 306 located in the cover sidewall 308. The liquid 150 drips into one or more receptacles 341 that is in communication with the slot 340. The vapor collection system embodiment 300 works if there is gravity, which on the Moon is about ⅙ of that on Earth.

Figure 5A:
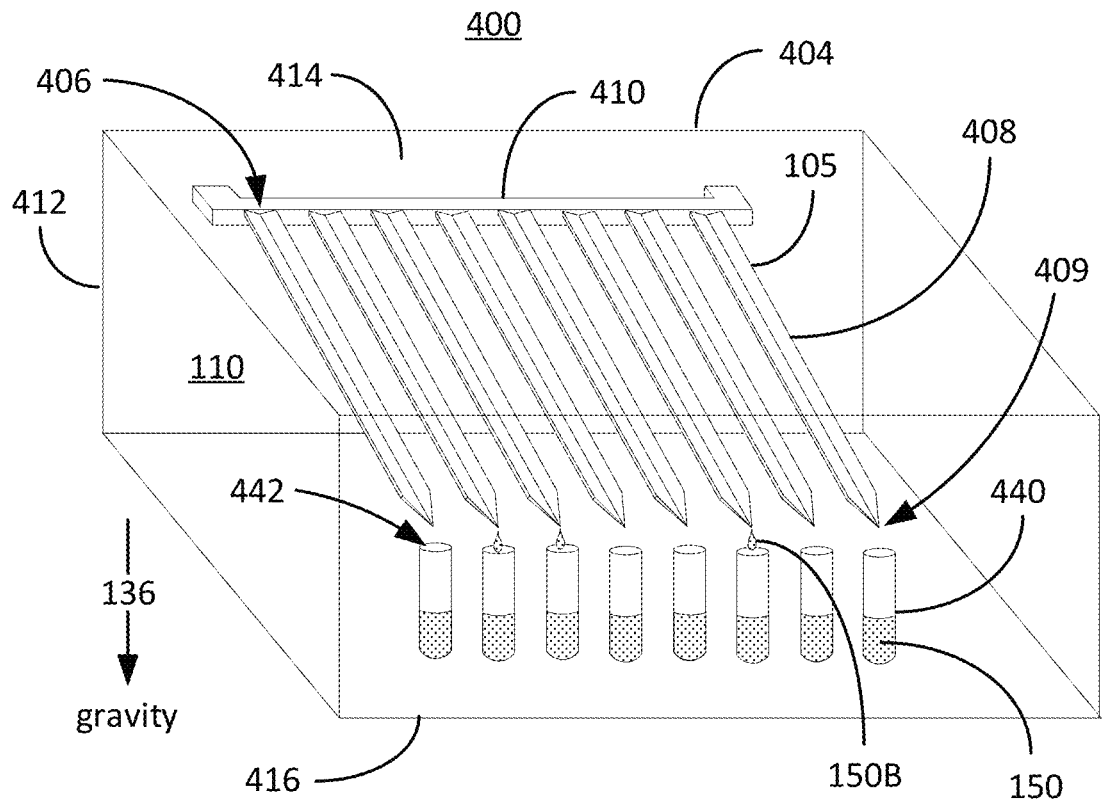
FIGS. 5A-5B are line drawings of yet another vapor collection system consistent with embodiments of the present invention.
Figure 5B:
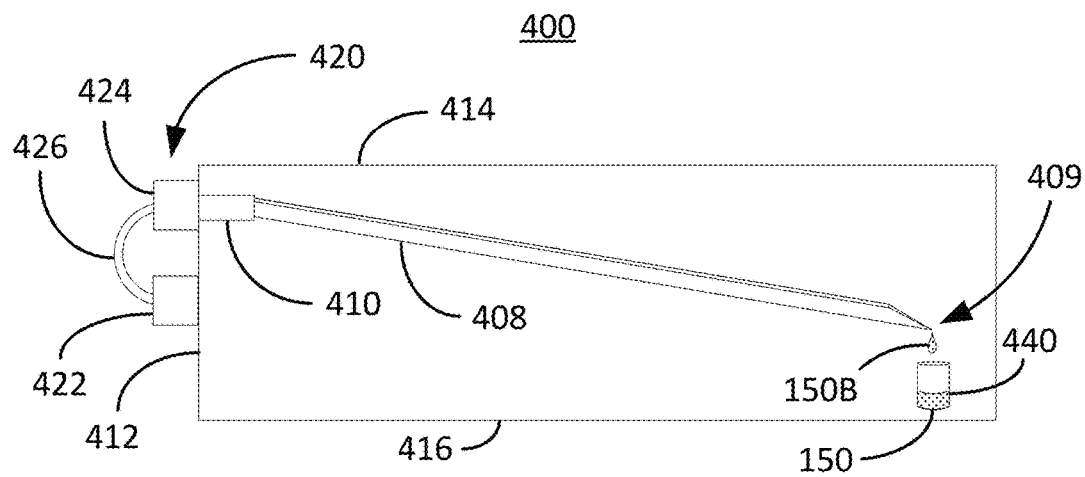

FIGS. 5A-5B are line drawings of yet another vapor collection system consistent with embodiments of the present invention. FIG. 5A is an isometric view of a vapor collection system embodiment 400 that comprises a plurality of static/fixed condensation blades 408 (which act as the condensation surface 105) that use gravity to migrate condensation droplets 150B to collection tubes 440. As shown here, the vapor collection system 400 comprises a plurality of V-shaped condensation blades 408 that are angled downward from each of their proximal ends 406. Optional embodiments contemplate the condensation blades having shapes that are not V-shaped, for example, flat, U-shaped, corrugated, etc. The blade proximal ends 106 are attached to a cryogenic liquid distribution conduit 410, which channels cryogenic liquid (not shown) that flows through the condensation blades 408 to chill them to temperatures that will cause condensation of target gaseous target material 115. Under the influence of gravity, the condensation droplets 150B will migrate to the distal drip edge 409 of the condensation blades 408 where the droplets 150B drip into the collection tubes 440 via their respective collection tube inlet ports 442. The condensed target material 150 accumulates in the collection tubes 440 as shown. Of course, gravity (shown by the arrow 136) is required for the vapor collection system 400 to work. The plurality of condensation blades 408 are disposed in the internal volume 110 of the cover 404. The cover 404 is defined by a cover top surface 414, cover sidewalls 412 and a cover rim 416 that defines an open side that rests atop regolith 112.

FIG. 5B is a side view line drawing of the vapor collection system 400 of FIG. 5A depicting the blade cooling system 420. This blade cooling system 420 generally comprises a cryogenic fluid reservoir 422 that holds the cryogenic fluid, which is accessed by a pump 424. The pump 424 circulates the cryogenic fluid through the cryogenic liquid distribution conduit 410 and into tubes (not shown) in the blade 408. The cryogenic fluid is used to chill the blade 408 to temperatures that will cause condensation of gaseous target materials 115 on to the surface of the blade 108. The cryogenic fluid can include liquid nitrogen, liquid oxygen, liquid hydrogen and liquid helium, for example. The condensed droplets 150B migrate along the blade 408 towards the distal drip edge 409 under the influence of gravity. When the condensed droplets 150B reach the distal drip edge 409, the condensed droplets 150B drip into the collection tube 440 where the condensed target material 150 is retained.

Figure 5C:
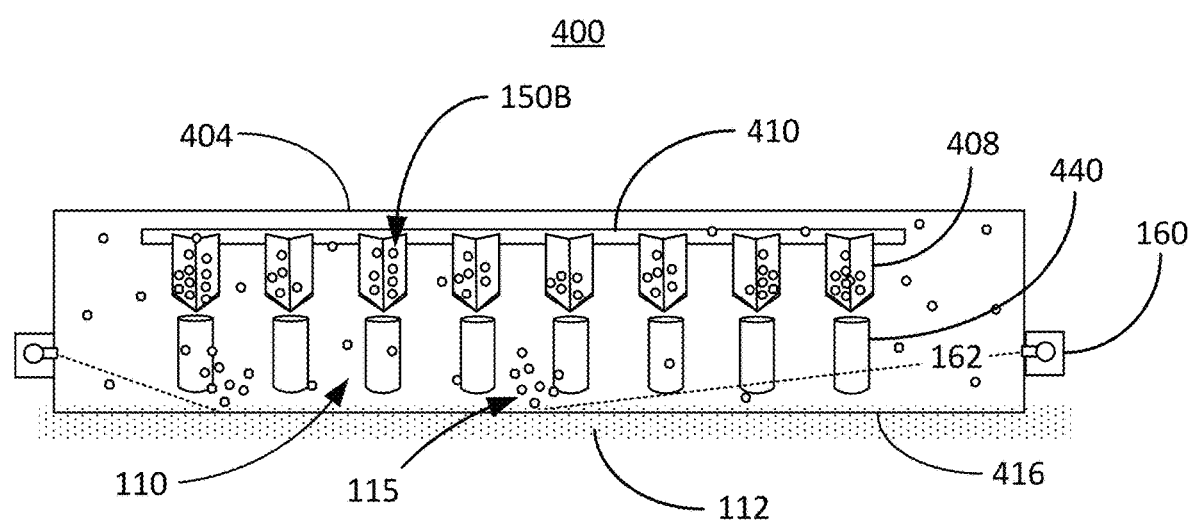
FIG. 5C is a front view line drawing that of the vapor collection system of FIG. 5A depicting gaseous target material being vaporized.

FIG. 5C is a front view line drawing of the vapor collection system 400 of FIG. 5A depicting gaseous target material 115 being vaporized by way of a laser beam 162 (the laser beam 162 is generated by a laser 160 that is configured to sweep across the surface of regolith 112). As shown, the gaseous target material 115 is dispersed in the internal volume 110 of the cover 404 that rests on the regolith surface 112 by way of the cover rim 460. The gaseous target material 115 condenses as droplets 150B on the cryogenically chilled blades 408 where the condensation droplets 150B drip into the collection tubes 440. The cryogenic liquid distribution conduit 410 is shown here for reference.

Figure 6A:
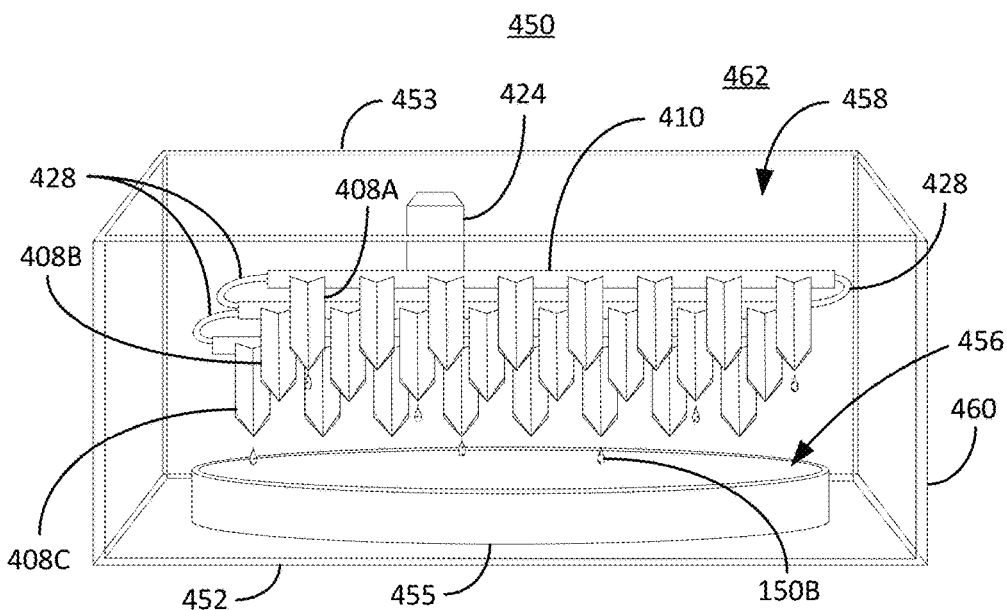
FIGS. 6A and 6B are line drawings showing yet another vapor collection system embodiment that has no cover but rather only sidewall shields consistent with embodiments of the present invention.
Figure 6B:
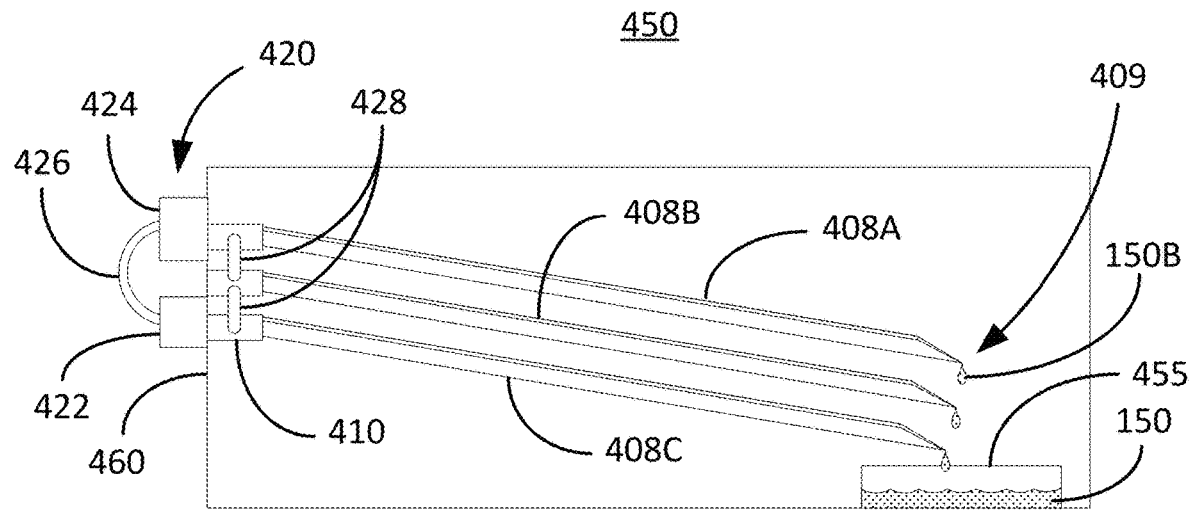

FIGS. 6A and 6B are line drawings showing yet another vapor collection system embodiment that has no cover but rather only sidewall shields consistent with embodiments of the present invention. As shown in FIG. 6A, the vapor collection system embodiment 150 comprises three rows of condensation blades 408 that are surrounded by a sidewall shield 460. More or less rows can be employed without departing from the scope and spirit of the present embodiment. The sidewall shield 460 is transparent to see the block diagram elements therein. The sidewall shield 460 has no top side and no bottom side. The bottom shield rim 452 is configured to rest on top of regolith 112 and the upper lip 453 provides unobstructed exposure opening 458 of the blades 408 to the heavens (exterior environment 462) to assist in the cooling effects of the blades 408. The blades 408A-408C act as a cover that covers at least 70% of an upper surface area 454 defined by the perimeter of the top edge 453. The sidewalls 460 extend from the bottom shield rim 452 to the top edge 453. The condensation rows 408A, 408B and 408C are staggered to essentially block any line of sight of liberated gaseous molecules or atoms 115 from the regolith 112 to the exterior environment 462. In other words, the liberated gaseous material 115 has a high probability of impacting or otherwise landing on the surface of the condensation blades 408 and a low probability of escaping into the heavens. The condensation blades 408 are cooled via cryogenic liquid that is pumped 424 from one cryogenic liquid distribution conduit 410 to another by way of connecting lines 428 in series. Optionally, the cryogenic liquid is pumped to individual distribution conduits 410 in parallel.

The gaseous target material 115 is configured to condense as droplets 150B on the cryogenically chilled blades 408 where the condensation droplets 150B drip into a collection receptacle 455 via a receptacle inlet region 456.

FIG. 6B is a side view line drawing of the vapor collection system embodiment 450 of FIG. 6A. The three condensation rows 408A, 408B and 408C are shown collecting and dripping the gaseous target material 115 into the collection receptacle 455. The distal drip edges 409 are staggered in this configuration to provide a clear path for the condensation droplets 150B to drip and collect 150 into the collection receptacle 455. As shown, the vapor collection system embodiment 150 comprises a cryogenic reservoir 422 that is mounted on the sidewall shield 460 along with the pump 424 that are connected by way of a cryogenic transfer line 426. Also shown are the cryogenic connection lines 428 that link together the cryogenic liquid distribution conduits 410. In this embodiment, the absence of a cover enhances the radiative cooling effects of the dark outer space directly facing the blades 408.

Cooling down a condensation surface 105 (such as a condensation blade 108 or 408 for example) to temperatures that will condense and liquify nitrogen, oxygen, hydrogen, helium, etc., on the Moon is a challenging task due to the extreme environmental conditions and lack of atmosphere. To boost heat transfer and energy exchange to chill a condensation surface 105, high conductive and in some cases high emissivity coatings are considered to boost cooling efficiency. Such high conductive materials are commonly known to include silver, copper, gold and aluminum, just to name a few. Certain inventive aspects contemplated herein take advantage of the lack of an appreciable atmosphere and the extreme low temperatures in shaded regions of the Moon. For example, the temperatures at the poles on the Moon can sink below 20° Kelvin, which can greatly boost the efficiency to the lower temperature of the blades 408. Also, exposing a smooth/high emissivity surface to outer space can improve lowering temperatures though radiative heat exchange. For these reasons, certain aspects of the present invention envision mining the target gaseous materials 115 in these colder regions of the Moon. However, the inventive aspects of the present invention will work on wormer and sunny sides of the Moon albeit, likely less efficiently.

Figures 7A, 7B:
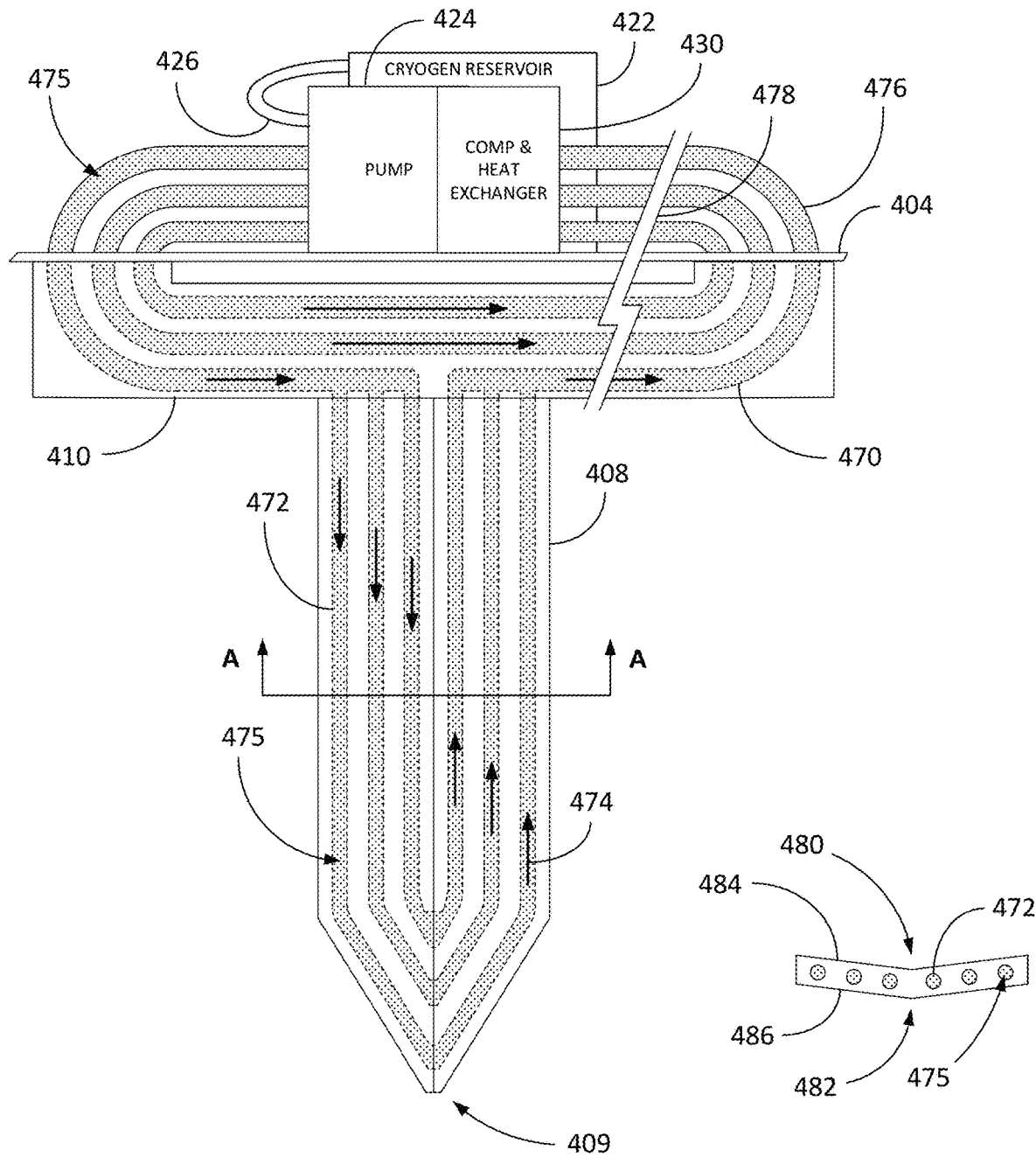
FIGS. 7A and 7B are line drawings depicting an active blade chilling embodiment consistent with embodiments of the present invention.

FIGS. 7A and 7B are line drawings depicting an active blade chilling embodiment consistent with embodiments of the present invention. Active cooling employs cooling methods to remove heat from the condensation surface 105. The most common technique is to use a cryogenic refrigeration system based on the principle of mechanical refrigeration. This system comprises a compressor, a condenser, an expansion valve, and a heat exchanger, which can be an evaporator. One embodiment of the present invention depicts the blade 408 from FIG. 5A, comprising a plurality of cryogenic heat exchange tubes 472 that loop inside of the blade 408. As shown in the cross-section along cut-lines A-A of FIG. 7B, the heat exchange tubes 472 have a cross sectional shape that is circular (but could optionally be some other shape, such as rectangular or elliptical, to name a couple) that are embedded in the blade 408 between a blade top surface 484 and a blade bottom surface 486. The blade 408 is V-shaped in this embodiment providing a concave 'trough' at the top surface 484 and a convex peak 482 at the bottom surface 486 to concentrate the condensation droplets 150B to more efficiently carry them to the distal drip edge 409. Cryogenic fluid 475 is pumped through the heat exchange tubes 472 as shown by the cryogenic fluid flow arrows 474 in FIG. 7A.

With greater detail, FIG. 7A depicts the movement of cryogenic fluid 475 through channels 468 in the blade 408. More specifically, the cryogenic fluid 475 is circulated via the pump 424 through the cryogenic feed lines 476 that feed the cryogenic fluid 475 to the distribution conduit channels 470 in the insulated cryogenic liquid distribution conduit 470, which feed the heat exchange tubes 472 in the blades 408. The compressor and heat exchanger 430 can be configured in several ways to cool the cryogenic fluid 475 including a radiator that simply radiates heat gathered in the blades 408 to the Moon's atmosphere, or by sublimation cooling, such as via a medium like dry ice, for example, configured in a similar manner to the cooling system used in a space suit and known to those skilled in the art. The cryogenic reservoir 422 is an insulated container, which contains the cryogenic fluid 475 that supplies the channels 468. The fluid path follows the arrows 474. A portion of the cryogenic liquid distribution conduit 410, distribution conduit channels 470, the cover 404 and the cryogenic feed lines 476 are cut away by way of the cut 478. A system compression cut-line 478 slices through a portion of the cryogenic liquid distribution conduit 410, distribution conduit channels 470, the cover 404 and the cryogenic feed lines 476 are cut away by way of the cut 478 to isolate a single blade 408. The system compression cut-line 478 streamlines the drawing in FIG. 7A.

Optional techniques to chill a blade 408 contemplates using thermoelectric coolers (TECs), which can be embedded in a blade 408 to actively remove heat by exploiting the Peltier effect. However, because TECs may have limitations in achieving very low temperatures, TECs may be used in combination with other cooling techniques.

As discussed in conjunction with embodiment of FIG. 6A, radiative cooling can further boost cooling the blades 408 by directing the blades 408 towards the cold lunar sky because the Moon's surface experiences extremely low temperatures during the lunar night.

Another embodiment of the present invention contemplates using laser cooling to achieve temperatures of below 3° Kelvin by exploiting the principles of quantum mechanics. In a process that involves manipulating the momentum of atoms through the selective absorption and remission of photons, this cooling mechanism relies on the Doppler effect in the recoil from photon absorption, causing the blade surface material to lose kinetic energy and consequently lower in temperature. Careful control of laser frequency and intensity, laser cooling may optionally be used to lower temperatures to collect helium-3.

Figure 8:
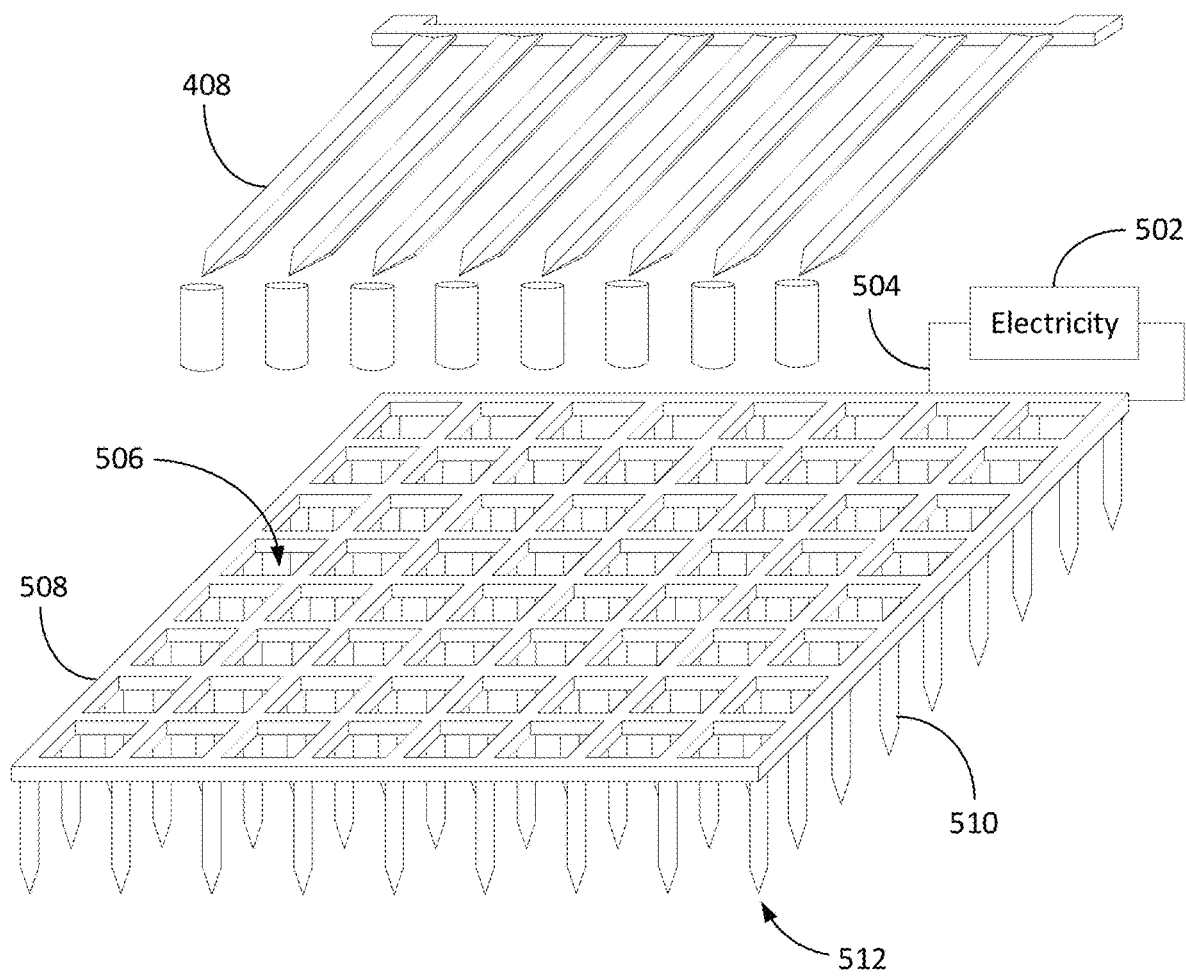
FIG. 8 is a line drawing that illustratively to depicts an optional regolith heating embodiment consistent with embodiments of the present invention.

FIG. 8 is a line drawing that illustratively to depicts an optional regolith heating embodiment consistent with embodiments of the present invention. This regolith heating embodiment 500 is one of many possible embodiments to raise the temperature of the regolith 112 at which the target gaseous material retained therein is liberated from the regolith 112. Certain embodiments envision that in addition to heating the regolith 112, chemicals, such as fluorine, can also be used to assist in liberating the target materials from the regolith 112. In this embodiment, a plurality of heated spikes 510 penetrate the surface of the regolith 112 by way of a sharp spike tip 512. The heated spikes 510 extend from the bottom of a screen/lattice 508 wherein the screen/lattice 508 comprises a plurality of openings 506 that provide a pathway for the liberated target gases 115 to escape from the regolith 112 and pass into the internal volume 110 (shown in the previous FIGS.). A block diagram of an electrical circuit 502 with electrical connecting lines 504 is shown to illustrate a power source to heat the spikes 510. This particular heating embodiment 500 is shown in conjunction with an arrangement that includes static condensation blades 408 from FIG. 5A, however it can be equally used with the rotary blades 108. One of the benefits of the laser heating source 160 over this embodiment is that there is the potential for lowering residual heat emanating from the surface of the regolith 112. Residual heat from the present embodiment 500 may add to the difficulty of chilling the blades 108 to below condensation temperatures of the target gaseous material 115.

Figure 9:
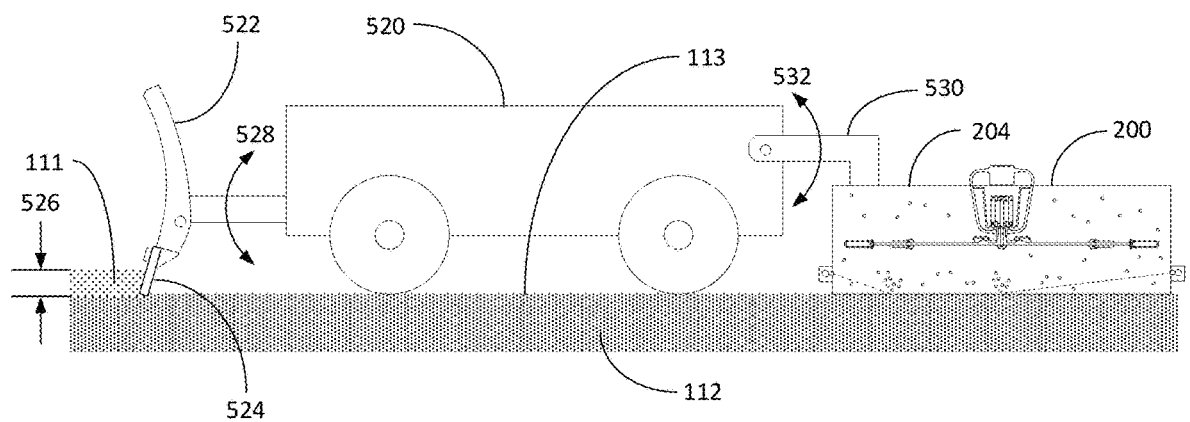
FIG. 9 is a line drawing that illustratively depicts a carrier vehicle, such as a rover, that supports a vapor collection system consistent with embodiments of the present invention.

FIG. 9 is a line drawing that illustratively depicts a carrier vehicle, such as a rover, that supports a vapor collection system consistent with embodiments of the present invention. The vapor collection system 200 is used here for example, however other vapor collections system embodiments can equally be used. One advantageous embodiment envisions the rover 520 providing all necessary power to operate the vapor collection system 200 and may further contain a sufficient amount of cryogenic fluid or support certain functionality of the vapor collection system 200, such as a cooling means to maintain the cryogenic fluid. However, optional embodiments contemplate the vapor collection system 200 having some, if not total, power capability that is independent of the rover 520, such as battery or solar power for example. As depicted, the rover 520 can include a vapor collection system support 530 that is configured to place the vapor collection system 200 on the regolith surface 113 so that the vapor collection system 200 can effectively mine new regolith 112 rich in the target material 115. Certain embodiments envision mining the regolith of the target material 115 down to a depth 526 of between 2 mm and 40 mm, for example. The vapor collection system support 530 lifts and lowers the vapor collection system 200 on the regolith surface 113, as shown by the collection system articulation arrow 532. The vapor collection system 200, in this embodiment, comprises a rectangular cover 204 that permits mining in a rectangular footprint. Hence, the rover 520 moves the vapor collection system 200 from one rectangular footprint to another, which more efficiently mines the regolith 112. Accordingly, this arrangement is configured to mine rows of regolith 112 at progressive depths. Hence, on a first pass along a regolith row, the plow 522 is raised to allow the vapor collection system 200 to access the untouched regolith 112. On ensuing passes, the plow 522 is lowered to a depth 526 (predetermined or determined by sampling target material concentration) that exposes unmined regolith rich in the target material 115. In other words, the plow 522 pushes away denuded regolith 111 that has been somewhat depleted of the target material 115 (depleted to a determined concentration of target material 115). FIG. 9 depicts the plow blade 524 extending on a front end of the rover 520 lowered 528 into the regolith to clear away the denuded regolith 111 (depicted with black and white dots that are less dense than the regolith 112) at a designated depth 526. In this way, the rover 520 can mine back and forth along a row of regolith 112 until it is considered reasonable to mine a new row. The plow blade 524 can be located under the rover 520, on the back of the rover 520 or elsewhere as long as it is able to clear away regolith for a new pass of the vapor collection system 200.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention contemplate a vapor collection system 100 (as shown in FIG. 6A) that has a shielded environment 110 that is in a pressure at or less than $1\times10^{-5}$ bar. The shielded environment comprises sidewalls 460 extending from a rim 106/452 to a top edge 453, wherein the shielded environment 110 is defined inside of the sidewalls 460. A condensation surface 105 is disposed in the internal volume 110, wherein the condensation surface 105 maintained at a temperature between 2° Kelvin and 100° Kelvin. A collection receptacle 140 that comprises an orifice 142 interfaces the condensation surface 105. A heating element 160 is located in the shielded environment 110, wherein the heating element 160 is configured to direct heat to a heat region 116 at or beyond the rim 106. The heating element 160 can be a laser 160 as shown in FIG. 3B or a lattice of heated spikes 510 as shown in FIG. 8, for example, though other heating elements such as a rake or sifter that can waterfall regolith 112 across a heater are envisioned without departing from the scope and spirit of the present invention.

In another embodiment of the vapor collection system 100, the condensation surface 105 is imagined to comprise at least one blade 108 that is configured to move inside of the shielded environment 110, such as a rotary blade as shown in FIG. 1A. Certain embodiment envision an electric motor 130 rotating the at least one blade 108, though in some embodiments gears on a carrier vehicle, such as a rover 520, as shown in FIG. 9, may drive the rotating blades 108, such as from the wheels.

Optionally, the vapor collection system embodiment 100 is envisioned wherein the condensation surface 105 is a fixed bar 408 that terminates 409 at a downward slope 136 with the receptacle 140 located where the fixed bar 408 terminates 409, as depicted in FIGS. 5A-6B.

The vapor collection system embodiment 100 further contemplates the heat region 116 being above 600° C. (873° Kelvin) when heated by the heating element 160, which is a temperature at which target gaseous materials trapped in the regolith 112 are vaporized and released from the regolith 112.

The vapor collection system embodiment 100 further contemplated to have the condensation surface 105 being electrically cooled using a thermoelectric cooler or optionally cooled using a laser system. These could be supported or substituted by a cryogenically cooled condensation surface 105 using cryogenic fluid.

In certain embodiments the vapor collection system embodiment 100 is envisioned having a top surface 414 coving the top edge 453 to form a cover 104/404.

In another optional embodiment of the vapor collection system 100, the condensation surface 105 can comprise a plurality of fixed bars 408 that terminates 409 at a downward slope 136 with the receptacle 140 located where the fixed bars 408 terminate 409, the fixed bars block at least 70% of an upper surface area 454 defined by the top edge 453. An example of this embodiment is shown in FIGS. 5A and 6A.

In another embodiment of the present invention, a vapor collector 100 can comprise a shielded environment 110 defined by a cover 104, wherein the shielded environment 110 is configured to operate at a pressure of less than $1\times10^{-5}$ bar. The vapor collector 100 further comprises a condensation surface 105, which is disposed in the shielded environment 110. The condensation surface 105 is maintained in operation at a temperature between 2° Kelvin and 100° Kelvin, which can be, for example, at a dark portion on the lunar surface. There can further be a collection receptacle 140 comprising an orifice 142 that interfaces the condensation surface 105. The vapor collector 100 is envisioned to further comprise a heating element 160 that is located in the shielded environment 110. The heating element 160 is configured to direct heat to a heat region 116 at or beyond the rim 106.

Some embodiments of the vapor collector 100 envision the condensation surface 105 being defined by a plate that includes at least one cryogenic heat exchange tube 172 interposed between a top surface 484 and a bottom surface 486, the condensation surface 105 comprises the top surface 484 and the bottom surface 486, such as that shown in FIGS. 7A and 7B, for example. This arrangement can leverage the use of a cryogenic fluid reservoir 422 and a pump 424 that is configured to circulate the cryogenic fluid through the at least one cryogenic heat exchange tube 172. Additionally, a compressor and heat exchanger 430 can be employed to maintain the cryogenic fluid by thermodynamically cooling or otherwise exchanging heat from the cryogenic fluid.

Some embodiments of the vapor collector 100 envision the condensation surface 105 comprising a plurality of blades 108 that are configured to spin inside of the shielded environment 110. In some instances, each of the blades 108 has a distal end 109 that is connected to a collection tube 140 that is configured to collect target material 150 that is condensed from vapor 115 on the blades 108 by way of centripetal force from the blades 108 when spinning.

In some embodiments, the vapor collector 100 has the shielded environment 110 maintained at a temperature below 150° Kelvin due to the nature of residing in a dark/night location of the Moon.

Still other embodiments of the present invention contemplate a gas collecting arrangement 100 comprising a shielded environment 110 that when in operation is at a pressure of less than 1×10−5 bar. The gas collecting arrangement 100 can comprise a condensation surface 105 in the internal volume 110, wherein there can be a means for maintaining the condensation surface 105 at a temperature between 2° Kelvin and 100° Kelvin. Such a means is shown in FIGS. 7A-7B but can further include electric and or laser cooling or some combination thereof. The gas collecting arrangement 100 can also comprise a collection receptacle 140 that interfaces the condensation surface 105. The condensation receptacle 140 can be configured to retain liquified gas 150 that condenses on the condensation surface 105 when somewhere in the temperature range between 2° Kelvin and 100° Kelvin. A heating element 160 is envisioned to be located in the shielded environment 110, wherein the heating element 160 is configured to heat a target region 116 at or beyond the rim 106.

The gas collecting arrangement 100 further envisions the condensation surface 105 comprising a plurality of blades 108 that are configured to spin inside of the shielded environment 110 as shown in FIG. 1A. As further shown in FIG. 1A, each of the blades 108 can be equipped with a collection tube 140 at each blade distal end 109. The collection tube 140 is configured to collect target material 150, floating around the shielded environment 110, that is condensed from vapor 115 on the blades 108 by way of centripetal force from the blades 108 when spinning.

These exemplified embodiments are not exhaustive of the embodiments presented throughout the description, but rather are merely one example of a contemplated embodiment chain consistent with embodiments of the present invention. In other words, there are numerous other embodiments described herein that are not necessarily presented in the apparatus embodiment examples presented immediately above.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the condensation surface 105 can include other geometries not explicitly shown in the embodiments above while maintaining essentially the same functionality without departing from the scope and spirit of the present invention. Likewise, the condensation surface 105 is depicted as being cooled by tubes running through a plate, but cryogenic conduits can just as easily run over or under the plate, be partially embedded in the plate, be a hollow plate with a large pocket therein, or something in between without departing from the scope and spirit of the present invention. All parts can be manufactured by printing techniques, molding techniques, machining or something that incorporates several techniques known to those skilled in the art of manufacturing. Additionally, though FIGS. 1A-1E depict a pump that is away from the blades requiring a slip ring arrangement, other embodiments contemplate a pump being on the blade to avoid any kind of static to spinning junction.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A vapor collection system comprising:
   a shielded environment;
   the shielded environment comprising sidewalls extending from a rim to a top edge, wherein the shielded environment is defined inside of the sidewalls;
   a condensation surface in the internal volume, the condensation surface maintained at a temperature between 2° Kelvin and 100° Kelvin;
   a collection receptacle comprising an orifice that interfaces the condensation surface; and
   a heating element located in the shielded environment that is configured to direct heat to a heat region at or beyond the rim.

2. The vapor collection system of claim 1, wherein the condensation surface is at least one blade configured to move inside of the shielded environment.

3. The vapor collection system of claim 1, wherein the condensation surface is a fixed bar that terminates at a downward slope with the receptacle located where the fixed bar terminates.

4. The vapor collection system of claim 1, wherein the heat region is above 600 degrees C. when heated by the heating element.

5. The vapor collection system of claim 2, further comprising an electric motor that rotates the at least one blade.

6. The vapor collection system of claim 1, wherein the condensation surface is electrically cooled using a thermoelectric cooler.

7. The vapor collection system of claim 1, wherein the condensation surface is cryogenically cooled using cryogenic fluid.

8. The vapor collection system of claim 1, wherein the condensation surface is cooled using a laser.

9. The vapor collection system of claim 1, wherein the top edge is covered by a top surface.

10. The vapor collection system of claim 1, wherein the condensation surface comprises a plurality of fixed bars that terminates at a downward slope with the receptacle located where the fixed bars terminate, the fixed bars block at least 70% of an upper surface area defined by the top edge.

11. A vapor collector comprising:
a shielded environment defined by a cover,
a condensation surface in the shielded environment, the condensation surface configured to be maintained at a temperature between 2° Kelvin and 100° Kelvin, when at the temperature;
a collection receptacle within the cover comprising an orifice that interfaces the condensation surface; and
a heating element located in the shielded environment that is configured to direct heat to a heat region at or beyond the rim.

12. The vapor collector of claim 11, wherein the condensation surface is defined by a plate that includes at least one cryogenic heat exchange tube interposed between a top surface and a bottom surface, the condensation surface comprises the top surface and the bottom surface.

13. The vapor collector of claim 12, further comprising a cryogenic fluid reservoir and a pump that is configured to circulate a cryogenic fluid through the at least one cryogenic heat exchange tube.

14. The vapor collector of claim 13, further comprising a compressor and heat exchanger that is configured to maintain the cryogenic fluid.

15. The vapor collector of claim 11, wherein the condensation surface comprises a plurality of blades configured to spin inside of the shielded environment.

16. The vapor collector of claim 15, wherein each of the blades has a distal end that is connected to a collection tube that is configured to collect target material that is condensed from vapor on the blades by way of centripetal force from the blades when spinning.

17. A gas collecting arrangement comprising:
a shielded environment defined by a cover;
a condensation surface in the cover;
a means for maintaining the condensation surface at a temperature between 2° Kelvin and 100° Kelvin;
a collection receptacle that interfaces the condensation surface, the condensation receptacle configured to retain liquified gas that condenses on the condensation surface when at the temperature; and
a heating element located in the shielded environment that is configured to heat a target region at or beyond the rim.

18. The gas collecting arrangement of claim 17, wherein the condensation surface comprises a plurality of blades configured to spin inside of the shielded environment.

19. The gas collecting arrangement of claim 18, wherein each of the blades has a distal end that is connected to the collection receptacle that is configured to collect target material that is condensed from vapor on the blades by way of centripetal force from the blades when spinning.

\* \* \* \* \*